(12) United States Patent
Yamashita

(10) Patent No.: US 11,631,881 B2
(45) Date of Patent: Apr. 18, 2023

(54) BATTERY MATERIAL STACKING DEVICE

(71) Applicant: KYOTO SEISAKUSHO CO., LTD., Kyoto (JP)

(72) Inventor: Manabu Yamashita, Kyoto (JP)

(73) Assignee: KYOTO SEISAKUSHO CO., LTD., Kyoto (JP)

( * ) Notice: Subject to any disclaimer, the term of this patent is extended or adjusted under 35 U.S.C. 154(b) by 157 days.

(21) Appl. No.: 17/055,329

(22) PCT Filed: Apr. 22, 2019

(86) PCT No.: PCT/JP2019/017027
§ 371 (c)(1),
(2) Date: Nov. 13, 2020

(87) PCT Pub. No.: WO2019/220875
PCT Pub. Date: Nov. 21, 2019

(65) Prior Publication Data
US 2021/0184240 A1    Jun. 17, 2021

(30) Foreign Application Priority Data

May 17, 2018    (JP) ............................. JP2018-095158

(51) Int. Cl.
*H01M 10/04*    (2006.01)
(52) U.S. Cl.
CPC ............................ *H01M 10/0404* (2013.01)
(58) Field of Classification Search
CPC .. B65G 49/068; B65G 47/914; B65G 47/915; B65G 47/917; B65G 47/918;
(Continued)

(56) References Cited

U.S. PATENT DOCUMENTS 3,822,008 A * 7/1974 Benner, Jr. ........... B65G 47/848
271/96
2003/0012636 A1* 1/2003 Fujino ................... H01M 10/14
414/795.8

(Continued)

FOREIGN PATENT DOCUMENTS

JP    2012-221707 A    11/2012
JP    2017-004615 A    1/2017

OTHER PUBLICATIONS

International Search Report for PCT/JP2019/017027 dated Jul. 16, 2019.

(Continued)

*Primary Examiner* — Niki Bakhtiari
*Assistant Examiner* — Bartholomew A Hornsby
(74) *Attorney, Agent, or Firm* — Millen, White, Zelano & Branigan, P.C.; William Nixon; Wan-Ching Montfort

(57) ABSTRACT

A battery material stacking device sequentially stacks sheet-like workpieces pertaining to a battery material at high speed. The battery material stacking device is provided with a conveyance mechanism configured to convey workpieces in a predetermined direction, a rotor arranged below the conveyance mechanism to rotate about a predetermined rotation shaft, a plurality of holding portions provided on a peripheral portion of the rotor to hold the workpieces, and a stacking table configured to stack the workpieces thereon. The plurality of holding portions is configured to hold one surface of each of the workpieces which is being conveyed with the other surface of each of the workpieces being held by the conveyance mechanism, then convey the workpieces in accordance with a rotation of the rotor while reversing the workpieces, and stack the workpieces on the stacking table with the other surface facing the stacking table.

12 Claims, 9 Drawing Sheets

(58) Field of Classification Search
CPC .............. B65G 47/945; B25J 15/0616; H01M 10/0413; H01M 10/0418; H01M 10/058; H01M 10/12; H01M 10/28; H01M 10/38; H01M 10/0404; H01M 10/0436; H01M 10/0468; H01M 10/04; H01M 10/044; H01M 10/0463; H01M 10/0472; H01M 10/0481; H01M 10/0486
See application file for complete search history.

(56) References Cited

U.S. PATENT DOCUMENTS

| | | | | |
|---|---|---|---|---|
| 2012/0132697 A1* | 5/2012 | Yano | ..................... | B29C 66/433 228/49.5 |
| 2014/0026398 A1* | 1/2014 | Watanabe | ........... | H01M 10/052 29/730 |

OTHER PUBLICATIONS

English Abstract of JP2017004615, Publication Date: Jan. 5, 2017.
English Abstract of JP2012221707, Publication Date: Nov. 12, 2012.

* cited by examiner

BATTERY MATERIAL STACKING DEVICE

TECHNICAL FIELD

The present invention relates to a battery material stacking device for stacking sheet-like workpieces pertaining to a battery material, such as, e.g., a positive electrode, a negative electrode, a separator, or a cell configured by them.

BACKGROUND OF THE INVENTION

Conventionally, a stacked type battery has been used in various batteries, such as, e.g., batteries for automobiles, residential batteries, and batteries for electronic equipment. The stacked type battery is configured by alternately stacking a positive electrode plate, a separator, and a negative electrode plate in this order. In the production of such a stacked type battery, a technique of alternately stacking an electrode plate and a separator or alternately stacking a cell in which an electrode plate and a separator are combined in advance is known (see Patent Documents 1 to 2).

For example, Patent Document 1 discloses an electrode plate stacking apparatus. In the electrode plate stacking apparatus, each alignment stage moves in the plane direction and/or rotates to adjust to the proper position by moving and/or rotating the positive electrode plate and the negative electrode plate. Then, the first move arm and the second move arm hold the respective electrode plates.

Further, Patent Document 2 discloses a stacking device equipped with a stacking unit, a gas blowing unit, and a control unit. The stacking unit includes a placing surface for placing a stacking member thereon, a stop portion elected at one end of the placing surface in the movement direction of the electrode to stop the electrode, and a stacking region provided between the placing surface and the stop portion. The gas blowing unit is arranged to face the placing surface to blow a gas against the stacking region of the stacking unit. The control unit is configured to control the gas blowing unit to blow a gas against the electrode after the electrode supplied to the stacking unit comes into contact with the stop portion.

PRIOR ART DOCUMENT

Patent Document

Patent Document 1: Japanese Unexamined Patent Application Publication No. 2012-174388
Patent Document 2: Japanese Unexamined Patent Application Publication No. 2017-081699

SUMMARY OF THE INVENTION

Problems to be Solved by the Invention

However, a conventional stacking apparatus has a problem that it is difficult to stack battery materials at high speed in a sequential manner.

The present invention has been made in view of the above-mentioned problems. An object of the present invention is to provide a battery material stacking device capable of sequentially stacking sheet-like workpieces pertaining to a battery material, such as, a positive electrode, a negative electrode, a separator, or a cell configured by them, at high speed.

Means for Solving the Problem

In order to attain the above-described object, the present invention provides a battery material stacking device for stacking sheet-like workpieces pertaining to a battery material such as a positive electrode, a negative electrode, a separator, or a cell configured by them. The battery material stacking device includes:

a conveyance mechanism configured to convey the workpieces in a predetermined direction;

a rotor arranged in a vicinity of the conveyance mechanism, the rotor being configured to rotate about a predetermined rotation shaft;

a plurality of holding portions provided at a peripheral portion of the rotor to hold the workpieces; and a stacking table configured to stack the workpieces thereon, wherein the plurality of holding portions is each configured to hold one surface of the workpiece conveyed with the other surface of the workpiece held by the conveyance mechanism, then rotationally convey the workpiece in accordance with a rotation of the rotor while reversing the workpiece, and stack the workpiece with the other surface facing the stacking table.

According to this configuration, a workpiece conveyed by the conveyance mechanism is held by the holding portion, rotationally conveyed in accordance with a rotation of the rotor while being reversed, and then sequentially stacked. Therefore, it is possible to sequentially stack sheet-like workpieces pertaining to a battery material at high speed.

Further, when stacking the workpiece on the stacking table by the holding portion, it is preferable that the rotor be kept rotating about the predetermined rotation shaft and the holding portion stop relative to the stacking table. With this configuration, when stacking the workpiece on the stacking table, the holding portion temporarily stops with the rotor being kept rotating. Therefore, a predetermined workpiece can be stably stacked on the stacking table without stopping the rotational conveyance of each workpiece by the rotor.

Further, the holding portion preferably stacks the workpiece on the stacking table in a state of inclining the workpiece W with the other surface of the workpiece W facing rearward in a rotational conveyance direction. With this configuration, since the workpiece is inclined obliquely downward in the rotational conveyance direction, it is possible to assuredly stack the workpiece on the stacking table.

Further, immediately before holding the one surface of the workpiece conveyed by the conveyance mechanism, the holding portion preferably approaches the conveyance mechanism in a state in which a holding surface of the holding portion for holding the workpiece is parallel to a conveyance plane of the workpiece by the conveyance mechanism. With this configuration, the holding surface of the holding portion approaches the workpiece in parallel thereto, so that the holding surface can assuredly hold the workpiece. In addition, in cases where the holding portion holds a workpiece by suction, the suction time for sucking the workpiece can be secured more sufficiently, so that the workpiece can be held more assuredly.

Further, immediately after holding the one surface of the workpiece conveyed by the conveyance mechanism, the holding portion is preferably configured to separate from the conveyance mechanism in a state in which a holding surface of the holding portion holding the workpiece is parallel to a conveyance plane of the workpiece by the conveyance mechanism. With this configuration, the workpiece separates from the conveyance mechanism in a state in which the workpiece is parallel to the conveyance plane. Therefore, it is possible to assuredly rotationally convey the workpiece thereafter.

Further, the holding portion may be configured to hold the workpiece by suction in a state in which a predetermined gap is formed between a holding surface for holding the workpiece and the one surface of the workpiece. With this configuration, it is possible to prevent the holding surface of the holding portion from rubbing against the one surface of the workpiece when the holding portion holds the workpiece. In cases where a plurality of rotors is provided, it is possible to prevent a workpiece from being unintentionally held by the holding portion of a predetermined rotor when a workpiece is made to pass the predetermined rotor in order to be held by a subsequent rotor.

Further, the holding portion may have a holding surface for holding the workpiece, the holding surface being formed in a gently curved convex surface along a rotational conveyance direction. With this configuration, tension is applied to the workpiece held by the holding portion. Therefore, it is possible to prevent the workpiece from being loosened or turned during the rotational conveyance by the holding portion.

Further, the holding portion may be configured to be operated by a cam mechanism provided on the rotor. For example, the cam mechanism may be provided with one or a plurality of cam members each having a cam groove of a predetermined trajectory and one or a plurality of cam followers connected directly or indirectly to the holding portion and slidably fitted in the cam groove. With this configuration, various operations of the holding portion can be assuredly realized with a simple configuration.

Further, the stacking table may be provided with a claw member at a front position in a rotational conveyance direction, and the claw member may be configured to receive a front side edge of the workpiece when the workpiece is stacked on the stacking table by the holding portion of the rotor. With this configuration, it is possible to assuredly stack workpieces on the stacking table with the front side edges of the workpieces aligned.

Further, the battery material stacking device may further include an imaging apparatus configured to image the workpiece when the workpiece is rotationally conveyed by the holding portion of the rotor, a drive device configured to move the stacking table in a plane direction of the stacking table or rotate the stacking table, and a controller configured to control a movement of the stacking table in the plane direction or a rotation of the stacking table via the drive device based on imaging data of the workpiece by the imaging apparatus. With this configuration, it is possible to assuredly stack the workpiece on the stacking table at a predetermined position in a predetermined posture.

Further, it may be configured such that a plurality of units each composed of the rotor, the holding portion, and the stacking table is arranged along a conveyance direction of the conveyance mechanism, and after completion of staking a predetermined number of workpieces by a predetermined unit composed of the rotor, the holding portion, and the stacking table, stacking of the workpieces by another unit composed of the rotor, the holding portion, and the stacking table is initiated. With this configuration, after completion of stacking a predetermined number of workpieces by a predetermined unit, the stacking of workpieces by another unit can be quickly initiated without interruption. Further, a predetermined number of workpieces pertaining to a predetermined unit can be conveyed to the following step during that time. Therefore, as compared with a conventional intermittently stacking type apparatus, it is possible to sequentially perform stacking and conveyance of workpieces, which makes it possible to dramatically improve the battery production efficiency.

Further, a battery production apparatus according to the present invention is characterized in that a battery production apparatus is provided with the above-described battery material stacking device. With this battery production apparatus, batteries can be efficiently produced.

Effects of the Invention

According to the present invention, a workpiece conveyed by the conveyance mechanism is held by the holding portion and rotationally conveyed in accordance with a rotation of the rotor while being reversed, and then stacked sequentially. Therefore, sheet-like workpieces pertaining to battery materials can be sequentially stacked at high speed, thus enabling efficient production of batteries.

EMBODIMENTS FOR CARRYING OUT THE INVENTION

Figure 1:
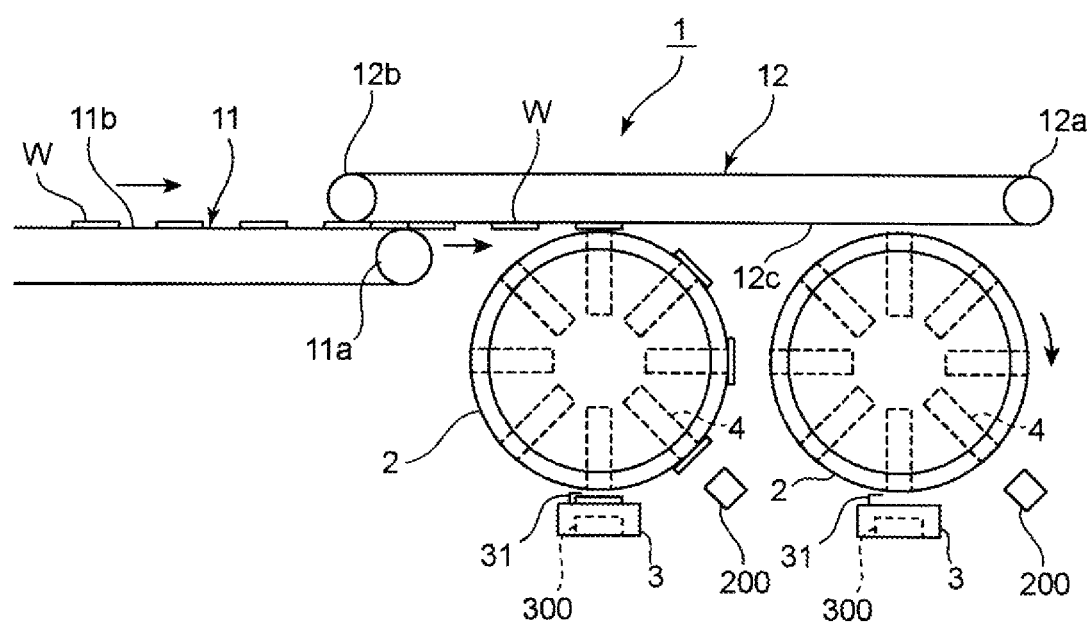
FIG. 1 is an overall configuration diagram showing a battery material stacking device according to an embodiment of the present invention.

Next, referring to FIG. 1 to FIG. 7, an embodiment of a battery material stacking device (hereinafter referred to as the "device") according to the present invention will be described.

In this embodiment, the following description will be directed to the case in which sheet-like workpieces W pertaining to a battery material, such as, e.g., a positive electrode, a negative electrode, a separator, or a cell configured by them will be conveyed and stacked. Although the workpiece W is very thin, for convenience of explanation, the workpiece W is illustrated to have a thickness in the drawings.

As shown in FIG. 1, the device is provided with a conveyance mechanism 1 for conveying workpieces W in a predetermined conveyance direction (right direction in FIG. 1), two rotors 2 arranged side by side along the conveyance direction of workpieces W below the conveyance mechanism 1, two stacking tables 3 arranged below the respective rotors 2, holding portions 4 provided on the respective rotors 2, and a controller 100 for controlling the operations of the conveyance mechanism 1, the rotors 2, and the stacking tables 3.

The conveyance mechanism 1 includes a first conveyance mechanism 11 arranged on the upstream side in the conveyance direction of the workpiece W and a second conveyance mechanism 12 arranged on the downstream side in the conveyance direction of the workpiece W. The first conveyance mechanism 11 and the second conveyance mechanism 12 are arranged such that the upstream side end portion of the second conveyance mechanism 12 in the conveyance direction and the downstream side end portion of the first conveyance mechanism 11 overlap vertically.

The first conveyance mechanism 11 is composed of a driving shaft 11a provided on the downstream side in the conveyance direction of the workpieces W, an unillustrated driven shaft provided on the upstream side in the conveyance direction of the workpieces W, and a conveyor belt 11b put on in an endless state between the driving shaft 11a and the driven shaft. The upper side conveyor belt 11b is moved in the conveyance direction in accordance with the rotation of the driving shaft 11a.

The second conveyance mechanism 12 is composed of a driving shaft 12a provided on the downstream side in the conveyance direction of the workpieces W, a driven shaft 12b provided on the upstream side in the conveyance direction of the workpieces W, and a conveyor belt 12c put on in an endless manner between the driving shaft 12b and the driven shaft 12a. The lower side conveyor belt 12c is moved in the conveyance direction in accordance with the rotation of the driving shaft 12b.

Thus, the workpiece W is placed on the upper side conveyor belt 11b of the first conveyance mechanism 11 with the one surface (lower surface) facing the upper side conveyor belt 11b and then sequentially conveyed toward the downstream side in the conveyance direction in accordance with the movement of the upper side conveyor belt 11b. Then, when reaching the downstream end of the first conveyance mechanism 11, the other end surface (upper surface) of the workpiece W is held by suction by the lower side conveyor belt 12c of the second conveyance mechanism 12. Thereafter, the workpiece W is sequentially conveyed toward the downstream side in the conveyance direction in a suspended state in accordance with the movement of the lower side conveyor belt 12c.

Note that in the process of being conveyed by the second conveyance mechanism 12, a predetermined number of workpieces W are stacked by the upstream side unit composed of a rotor 2, a stacking table 3, and the holding portions 4 arranged on the upstream side in the conveyance direction and then a predetermined number of workpieces W are stacked by the downstream side unit composed of a rotor 2, a stacking table 3, and the holding portions 4 arranged on the downstream side in the conveyance direction.

The rotor 2 is formed in a disk shape of a predetermined size and has a rotation shaft 21 parallel to a width direction (depth direction in FIG. 1) perpendicular to the conveyance direction of the workpieces W in the base. The rotor 2 is configured to rotate clockwise by an unillustrated driving mechanism in the conveyance direction while synchronized with the conveyance of the second conveyance mechanism 12.

Figure 2:
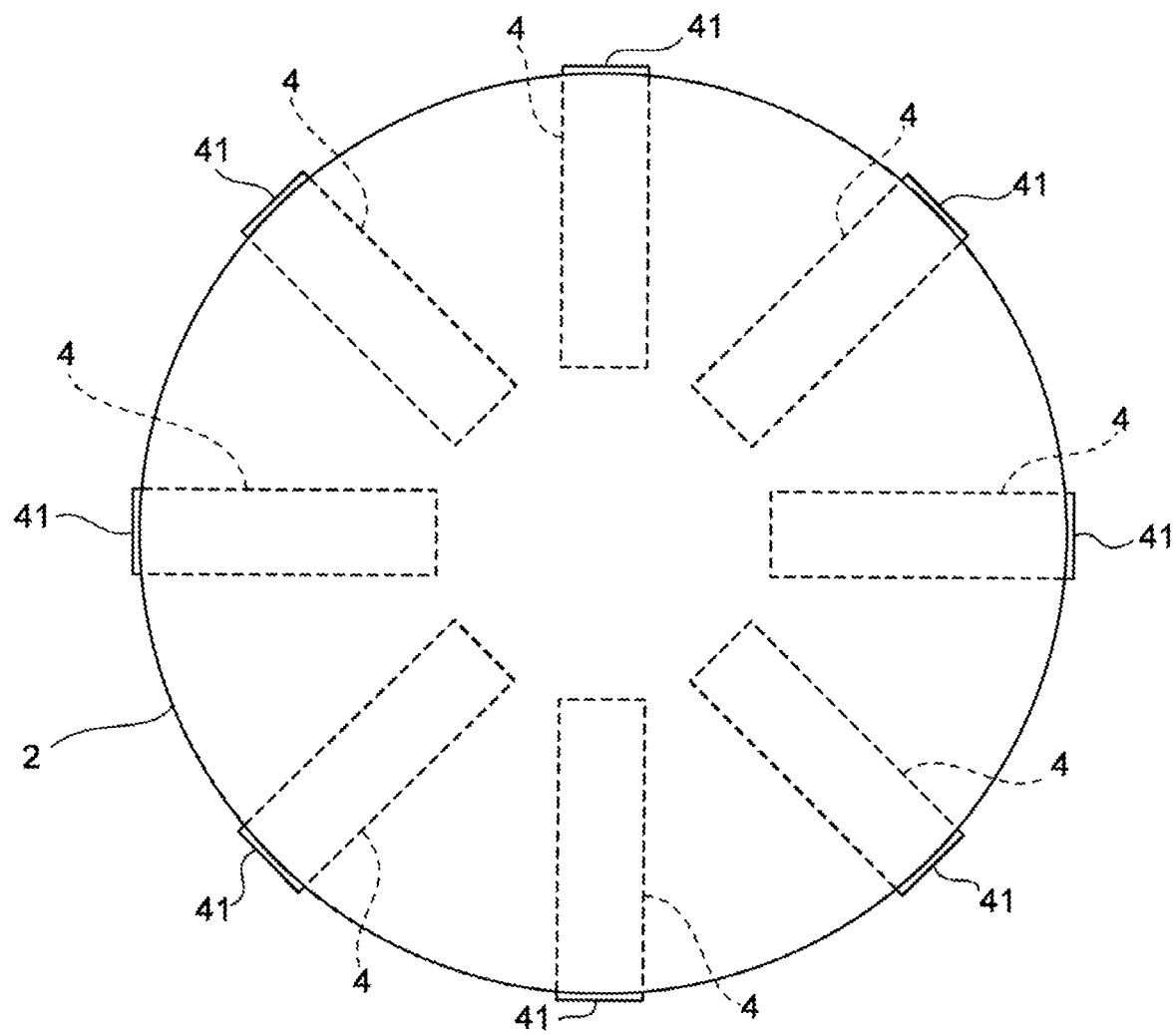
FIG. 2 is a front view of a rotor of the device shown in FIG. 1.
Figure 3:
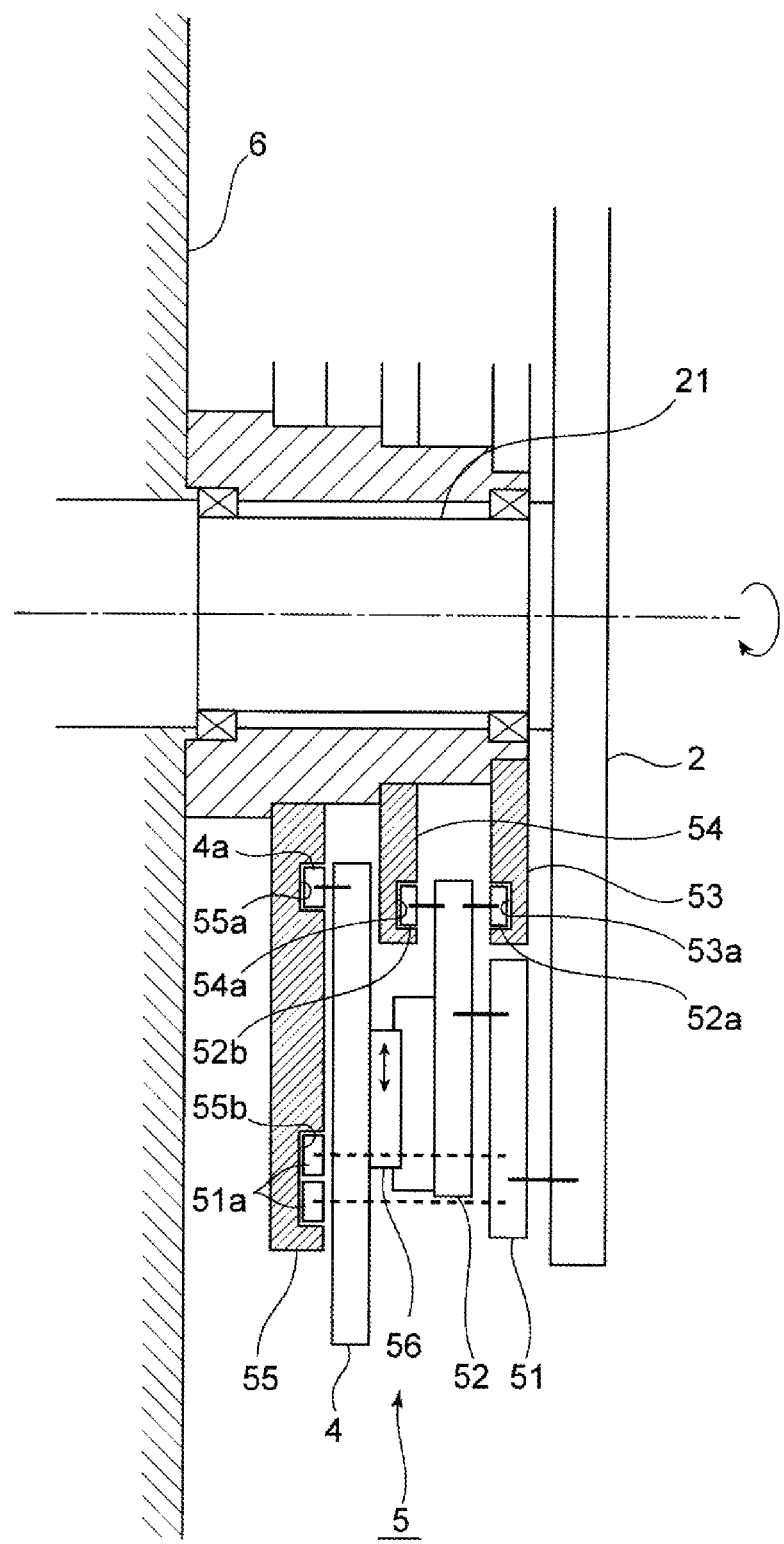
FIG. 3 is a cross-sectional view showing a cam mechanism of the device shown in FIG. 1.

On the peripheral portion of the rotor 2, a plurality of holding portions 4 is provided at equal intervals in the circumferential direction. As shown in FIG. 2, the holding portion 4 is provided in a radially extending manner and has a distal end portion as a holding surface 41 for holding a workpiece W by suction. The holding portion 4 integrally rotates with the rotor 2 in accordance with the rotation of the rotor 2.

Thus, in the process of being conveyed in the conveyance direction by the second conveyance mechanism 12, the one surface of the workpiece W is held by the holding portion 4 of the rotor 2 and then rotationally conveyed to the stacking table 3 arranged below while being reversed in accordance with the rotation of the rotor 2.

In this embodiment, the holding portion 4 rotates in accordance with the rotation of the rotor 2 and also performs various operations by a predetermined cam mechanism 5 provided in the rotor 2. Hereinafter, the cam mechanism 5 will be described in detail with reference to FIG. 3 and FIG. 4.

The cam mechanism 5 is provided in a space between the rotor 2 and the base 6. The cam mechanism 5 is provided with a first cam member 51 connected to the rotor 2, a second cam member 52 connected to the first cam member 51 and connected to the front side of the holding portion 4 via a straight advance guide 56, a third cam member 53 and a fourth cam member 54 provided on the rotation shaft 21 and connected to the second cam member 52, and a fifth cam member 55 connected to the back side of the holding portion 4.

Thus, the holding portion 4 is connected to the rotor 2 via the first cam member 51 and the second cam member 52. Therefore. The holding portion 4 can rotate at high speed in accordance with the rotation of the rotor 2, while maintaining the posture extending in the radial direction of the rotor 2.

Figure 4:
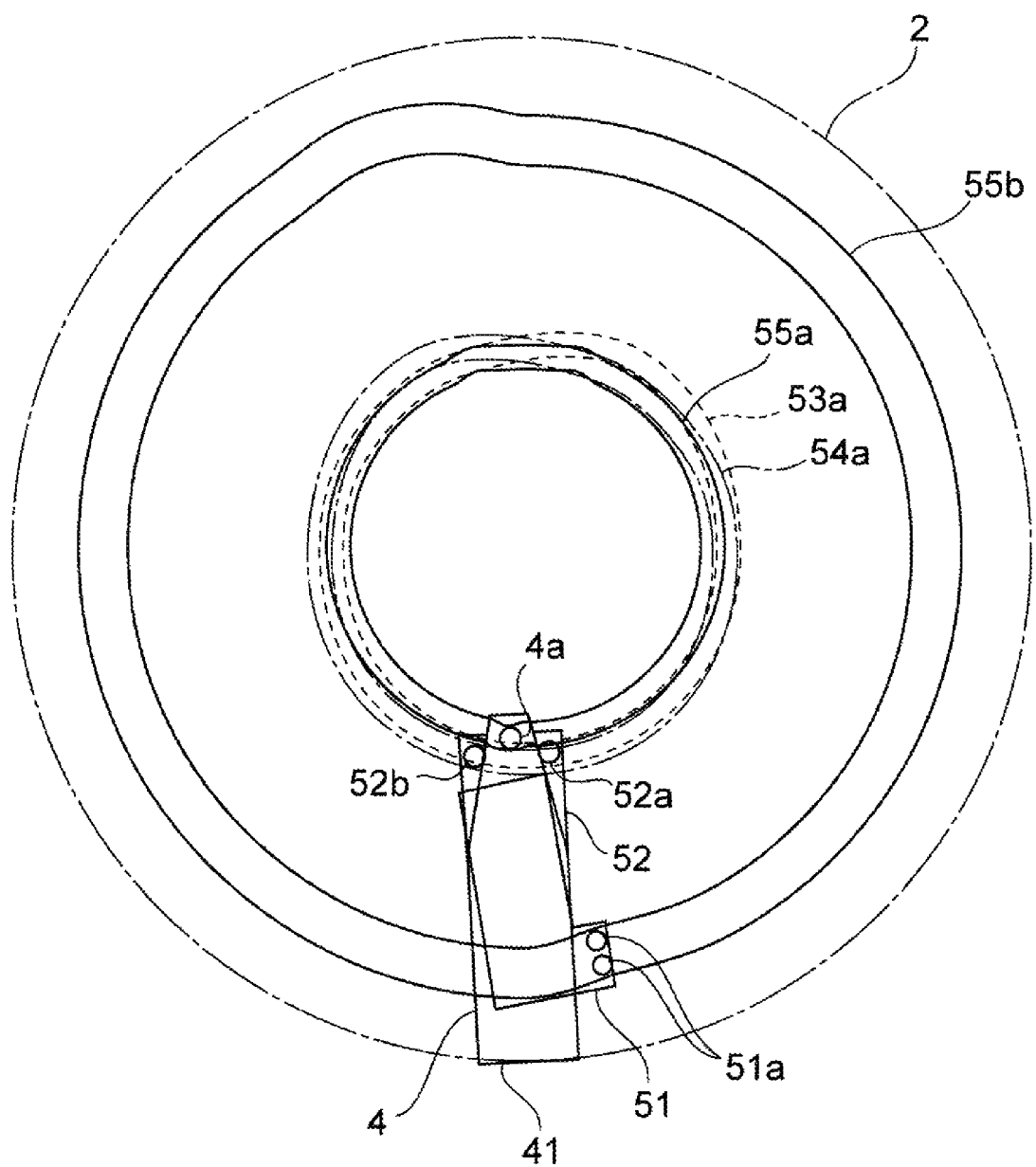
FIG. 4 is a front view showing the relationship between a rotor and a cam groove of the device shown in FIG. 1.

Further, a cam follower 4a is provided at the proximal end of the holding portion 4. The cam follower 4a is slidably fitted in the cam groove 55a formed in the fifth cam member 55. The cam groove 55a of the fifth cam member 55 is configured to adjust the radial movement of the holding portion 4. As shown in FIG. 4, the cam groove 55a is formed in a substantially annular trajectory protruding radially outward at the top dead center and the bottom dead center. Therefore, the holding portion 4 rotates while depicting a substantially circular trajectory in accordance with the rotation of the rotor 2. When the cam follower 4a of the holding portion 4 reaches the top dead center or the bottom dead center, the holding portion 4 moves upward or downward than a normal circular trajectory while sliding via the straight advance guide 56 with respect to the second cam member 52. As a result, the holding portion 4 can securely hold a workpiece W by moving upward when holding the workpiece W conveyed by the conveyance mechanism 1. Further, the holding portion 4 can assuredly stack a workpiece by moving downward when stacking the workpiece W on the stacking table 3.

Particularly in this embodiment, the upper portion of the cam groove 55a of the fifth cam member 55 is formed in a substantially trapezoidal trajectory parallel to the conveyance surface of the workpiece W by the conveyance mechanism 1. Therefore, the holding portion 4 can maintain the state of being moved upward for a certain period of time when holding a workpiece W conveyed by the conveyance mechanism 1.

On the front side and the back side of the proximal end portion of the second cam member 52, cam followers 52a and 52b are provided, respectively. The front side cam follower 52a is slidably fitted in the cam groove 53a of a substantially annular trajectory formed in the third cam member 53. The rear side cam follower 52b is slidably fitted in the cam groove 54a of a substantially annular trajectory formed in the fourth cam member 54. The cam groove 53a of the third cam member 53 and the cam groove 54a of the fourth cam member 54 are configured to adjust the posture of the holding portion 4. As shown in FIG. 4, these cam grooves 53a and 54a are formed in a state of being mutually eccentric to the left and right with respect to the rotational center of the rotor 2.

Therefore, immediately before holding the one surface of the workpiece W conveyed by the conveyance mechanism 1, the holding portion 4 can approach the conveyance mechanism 1 in a state in which the holding surface 41 is parallel to the conveyance plane of the workpiece W by the conveyance mechanism 1, and therefore the holding portion can assuredly hold the workpiece W. In particular, in cases where the holding portion 4 holds the workpiece W by suction, the holding portion 4 can more assuredly hold the workpiece W because the suction time with respect to the workpiece can be sufficiently secured. Further, immediately after holding the one surface of the workpiece W conveyed by the conveyance mechanism 1, the holding portion 4 can separate from the conveyance mechanism 1 in a state in which the holding surface 41 is parallel to the conveyance surface of the workpiece W conveyed by the conveyance mechanism 1. Therefore, the holding portion 4 can assuredly rotationally convey the workpiece W thereafter. Furthermore, the holding portion 4 can stack the workpiece W on the stacking table 3 in a state of inclining the workpiece W with the other surface of the workpiece W facing rearward in the rotational conveyance direction.

Further, at the distal end portion of the fifth cam member 55, a pair of cam followers 51a are provided via unillustrated connecting members. The cam followers 51a are slidably fitted in the cam groove 55b formed in the fifth cam member 55. The cam groove 55b of the fifth cam member 55 is configured to adjust the rotational phase of the holding portion 4. As shown in FIG. 4, the cam groove 55b is formed in a substantially annular trajectory recessed radially inwardly at the bottom dead center. Therefore, while the cam followers 51a of the first cam member 51 pass through the recessed portion near the bottom dead center of the cam groove 55b of the fifth holding portion 55, the rotational phase of the holding portion 4 and that of the first cam member 51 are shifted. Therefore, the cam follower 4a becomes in a state in which the holding portion 4 is temporarily stopped with respect to the stacking table 3. Then, when the cam followers 51a of the first cam member 51 completely pass through the recessed portion near the bottom dead center of the cam groove 55b of the fifth holding portion 55, the rotational phase of the holding portion 4 and that of the second cam member 52 coincide again. With this, the holding portion 4 rotates again in accordance with the rotation of the rotor 2. As described above, when stacking a workpiece W on the stacking table 3, the holding portion 4 is temporarily stopped with the rotor 2 being kept rotating. Therefore, without stopping the rotational conveyance of the respective workpieces W by the rotor 2, a predetermined workpiece W can be stably stacked on the stacking table 3.

The stacking table 3 is configured to sequentially stack the workpieces W rotationally conveyed by the holding portions 4. The stacking table 3 adjusts the position and/or the posture of the workpiece W by gradually moving downward every time the workpiece W is stacked and moving in the plane direction and rotating, by the controller 100 via the drive device 300.

Further, the stacking table 3 is provided with a claw member 31 at the front side position in the rotational conveyance direction of the rotor 2. The claw member 31 is configured to receive the front side edge portion of the workpiece W when stacking the workpiece W by the holding portion 4. Note that a claw member for pressing the rear side edge portion of the workpiece W after stacking the workpiece W on the stacking table 3 may be provided.

Figure 5:
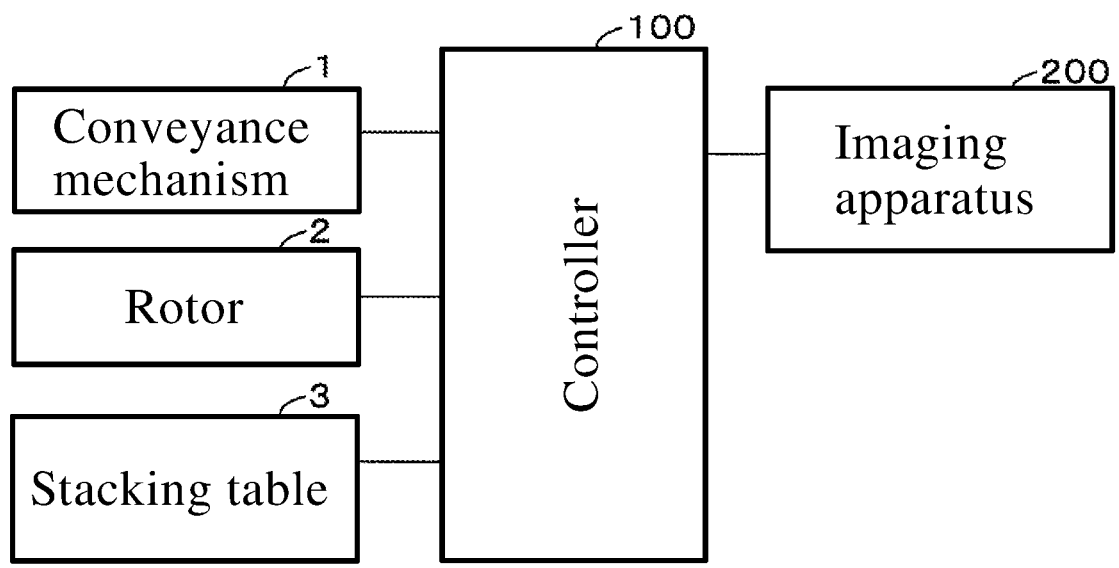
FIG. 5 is a diagram showing an electrical configuration of the device shown in FIG. 1.

As shown in FIG. 5, the controller 100 controls the conveyance operations of the first conveyance mechanism 11 and the second conveyance mechanism 12 of the conveyance mechanism 1, the rotational operation of the rotor 2, and the vertical operation of the stacking table 3 (drive device 300).

In this embodiment, an imaging apparatus 200 is provided at the peripheral portion of each rotor 2. The imaging apparatus 200 is configured to image the workpiece W when the workpiece W is rotationally conveyed by the holding portion 4 of the rotor 2. With this, the controller 100 controls the movement of the stacking table 3 in the plane direction and/or the rotation of the stacking table 3 via the drive device 300 based on the imaging data of the workpiece W by the imaging apparatus 200.

Next, the operation of holding and stacking workpieces W by the rotor 2, the stacking table 3, and the holding portion 4 of the device on the upstream side will be described with reference to FIG. 6 and FIG. 7.

Figure 6:
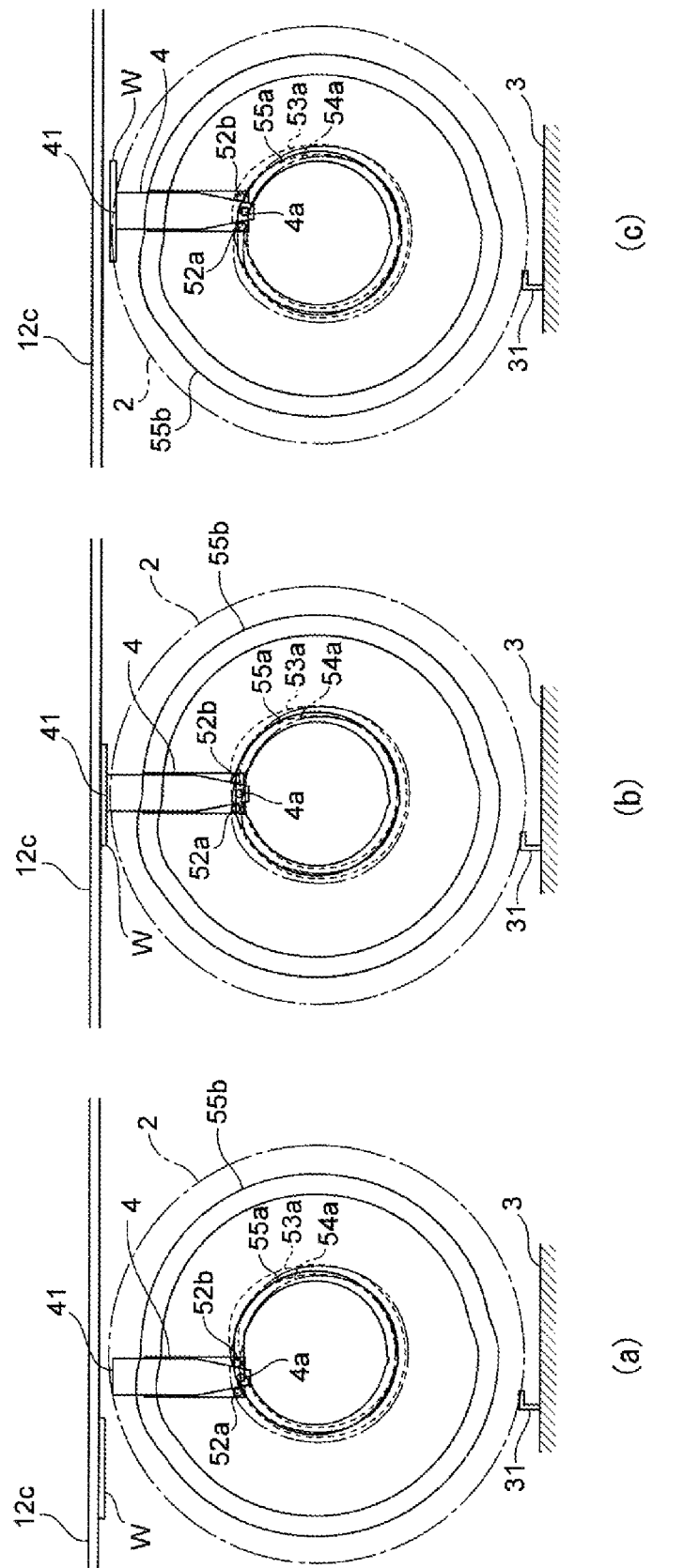
FIG. 6 is a diagram showing the operation at the top dead center of the rotation of the device shown in FIG. 1.
Figure 7:
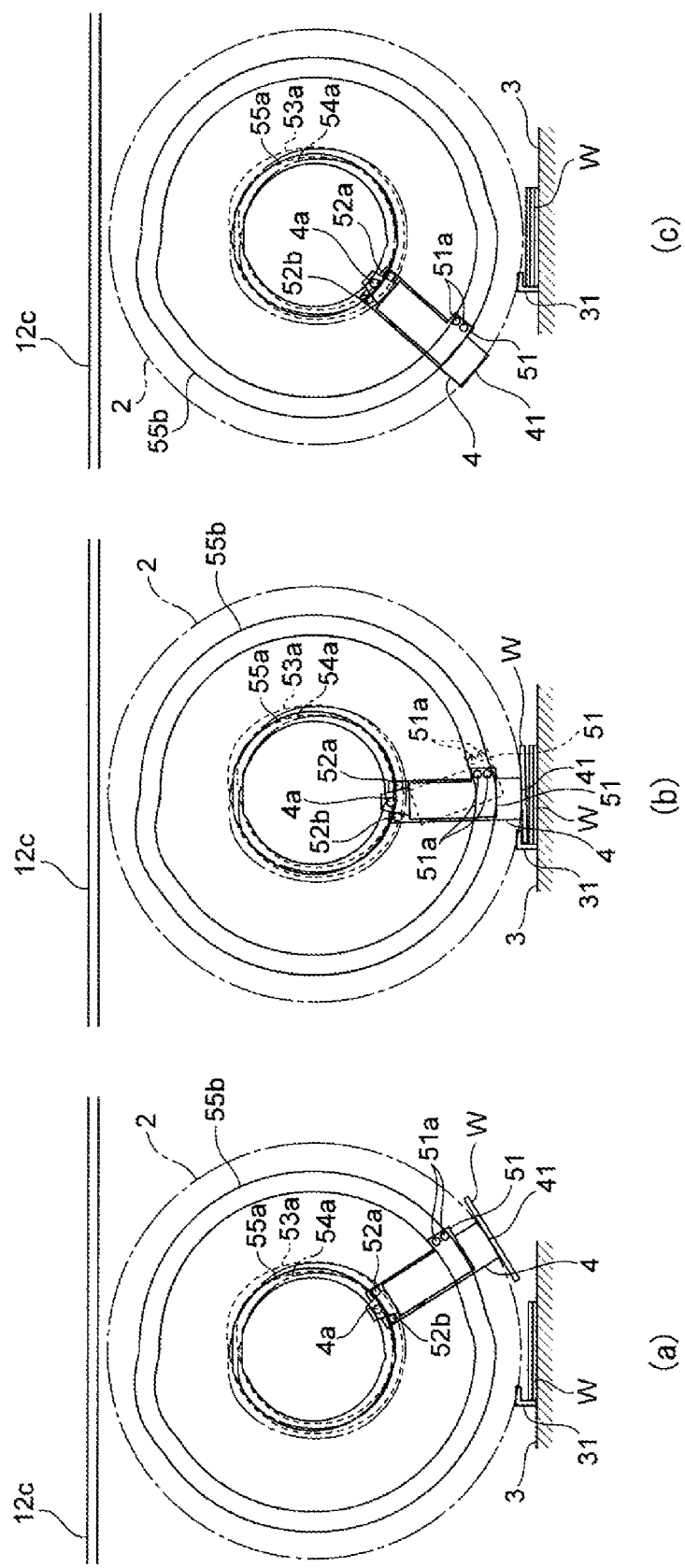
FIG. 7 is a diagram showing the operation at the bottom dead center of the rotation of the device shown in FIG. 1.

As shown in FIG. 6, in the process of rotating in accordance with the rotation of the rotor 2, the holding portion 4 approaches the second conveyance mechanism 12 of the conveyance mechanism 1 so as to protrude upward from the rotor 2 by the cam follower 4a and the cam groove 55a of the fifth cam member 55 when reaching the top dead center of the rotation. After holding the one surface (lower surface) of the workpiece W conveyed by the second conveyance mechanism 12, the holding portion 4 separates from the second conveyance mechanism 12 to return to the rotor 2.

At this time, the holding portion 4 behaves as follows by the cam followers 52a and 52b of the second cam member 52, the cam groove 53a of the third cam member 53, and the cam groove 54a of the fourth cam member 54. Immediately before holding the one surface of the workpiece W conveyed by the conveyance mechanism 1, the holding surface 41 approaches the conveyance mechanism 1 in a state in which the holding surface 41 is parallel to the conveyance plane of the workpiece W by the conveyance mechanism 1. Immediately after holding the one surface of the workpiece W conveyed by conveyance mechanism 1, the holding portion 4 separates from the conveyance mechanism 1 in a state in which the holding portion 4 is parallel to the conveyance plane of the workpiece W by the conveyance mechanism 1.

On the other hand, the holding portion 4 rotationally conveys the workpiece W downward while inverting the workpiece W in accordance with the rotation of the rotor 2. As shown in FIG. 7, when reaching the bottom dead center of the rotation of the rotor 2, the holding portion 4 behaves as follows by the cam follower 4a of the holding portion 4 and the cam groove 55a of the fifth cam member 55. That is, the holding portion 4 approaches the stacking table 33 in a manner as to protrude downward from the rotor 2 and releasing the holding of the workpiece W with the other surface of the workpiece W facing the stacking table 3 to stack the workpiece W on the stacking table 3.

At this time, the holding portion 4 temporarily stops by the cam follower 51a of the first cam member 51 and the cam groove 55b of the fifth cam member 55 with the rotor being kept rotated. Therefore, the holding portion 4 can stably stack a predetermined workpiece W on the stacking table 3 without stopping the rotational conveyance of the respective workpiece W by the rotor 2.

Further, by the cam followers 52a and 52b of the second cam member 52, the cam groove 53a of the third cam member 53, and the cam groove 54a of the fourth cam member 54, the holding portion 4 assuredly stack the workpiece W on the stacking table 3 in a state of inclining the workpiece W with the other surface of the workpiece W facing rearward in the rotational conveyance direction.

Thereafter, the holding portion 4 rotates upward in accordance with the rotation of the rotor 2 and reaches the top dead center of the rotation of the rotor 2 as described above. Again, the holding portion 4 holds a workpiece W conveyed by the second conveyance mechanism 12 by suction and rotationally conveys the workpiece W downward to the stacking table 3 while reversing the workpiece W.

Note that after completion of the stacking of a predetermined number of workpieces W by the upstream side unit composed of the rotor 2, the stacking table 3, and the holding portion 4, the stacking of a predetermined number of workpieces W by the downstream side unit composed of the rotor 2, the stacking table 3, and the holding portion 4 is initiated and the predetermined number of workpieces W stacked by the upstream side unit composed of the rotor 2, the stacking table 3, and the holding portion 4 are conveyed to the next step. Further, after completion of the stacking of a predetermined number of workpieces W by the downstream side unit composed of the rotor 2, the stacking table 3, and the holding portion 4, the stacking of a predetermined number of workpieces W by the upstream side unit composed of the rotor 2, the stacking table 3, and the holding portion 4 is initiated and the predetermined number of workpieces W stacked by the downstream side unit composed of the rotor 2, the stacking table 3, and the holding portion 4 are conveyed to the next step.

In this way, after completion of the stacking of the predetermined number of workpieces W by the predetermined unit on the upstream side or the downstream side, the stacking of workpieces W by another unit on the downstream side or the upstream side can be initiated without interruption. Further, during that time, the predetermined number of workpieces W stacked by the predetermined unit on the upstream side or the downstream side can be conveyed to the next step. Therefore, as compared with a conventional intermittent stacking apparatus, it is possible to sequentially perform the stacking and the conveyance of workpieces, which makes it possible to dramatically improve the manufacturing efficiency of batteries.

Note that in this embodiment, the holding portion 4 is operated by the cam mechanism 5, but the holding portion 4 may be operated by other mechanisms.

Further, although an example is shown in which the holding portion 4 performs the operation to become parallel to the conveying surface of the workpiece W when approaching and separating from the conveyance mechanism 1 and also performs the operation to temporarily stop when stacking the workpiece W on the stacking table 3. But the holding portion 4 is not always required to perform these operations.

Figure 8:
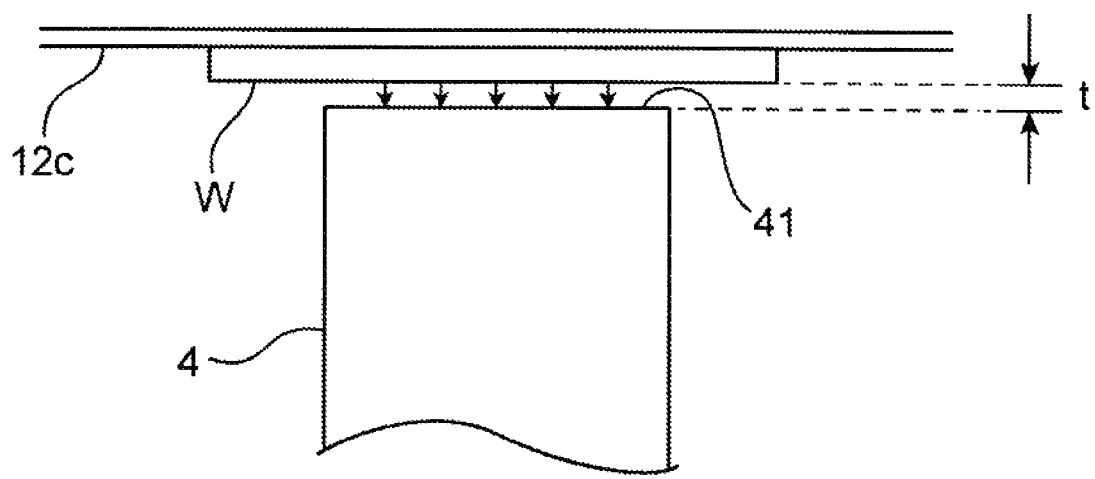
FIG. 8 is a diagram showing a holding portion according to another embodiment of the present invention.

Further, when holding the workpiece W, as shown in FIG. 8, the holding portion 4 may hold the workpiece W by suction in a state in which a predetermined gap "t" is provided between the holding surface 41 holding the workpiece W and the one surface of the workpiece W. In this case, the conveyor belt 12c on the lower side of the second conveyance mechanism 12 may release the suction of the workpiece W to open to the atmosphere. This can prevent the holding surface 41 of the holding portion 4 from rubbing against the one surface of the workpiece W when the holding portion 4 holds the workpiece W. Further, in cases where a plurality of rotors 2 is provided, it is possible to prevent a workpiece W from being unintentionally held by a holding portion 4 of the predetermined rotor 2 when the workpiece W is intended to pass through the predetermined rotor 2 so that the workpiece W is held by the holding portion 4 of the following rotor 2.

Figure 9:
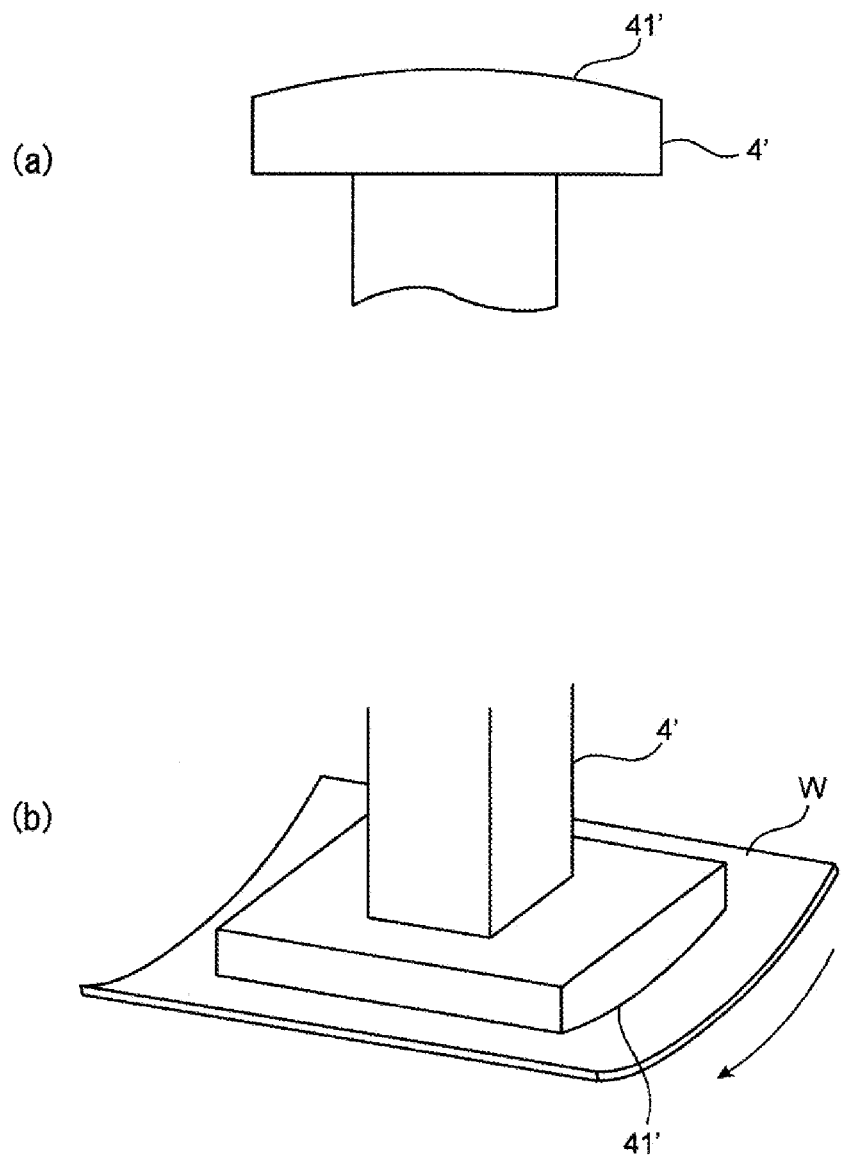
FIG. 9 is a diagram showing a holding portion according to another embodiment of the present invention and a suction operation of a workpiece.

Further, as shown in FIG. 9, the holding portion 4' may have a holding surface 41' for holding the workpiece W formed in a convex shape gradually curved along the rotational conveyance direction. With this configuration, since the workpiece W held by the holding portion 4' is tensioned, it is possible to prevent the workpiece W from being rattled or turned while the workpiece W is being rotationally conveyed by the holding portion 4.

The shape and/or the size of the holding portion 4 are not particularly limited, but the shape and/or the size are preferably formed so as not to interfere with the claw member 31 and other members when the workpiece W is stacked on the stacking table 3.

The embodiments of the present invention have been described above with reference to the attached drawings, but the present invention is not limited to the illustrated embodiments. It should be understood that various modifications and variations can be made to the illustrated embodiments so as to fall within the same or equivalent scope of the present invention.

DESCRIPTION OF SYMBOLS

1: Conveyance mechanism
  11: First conveyance mechanism
  12: Second conveyance mechanism
2: Rotor
3: Stacking table
4: Holding portion
  41: Holding surface
5: Cam mechanism
  51: First cam member
  52: Second cam member
  53: Third cam member
  54: Fourth cam member
  55: Fifth cam member
  56: Straight advance guide
6: Base
100: Controller
200: Imaging apparatus
300: Drive device
W: Workpiece

The invention claimed is:

1. A battery material stacking device for stacking sheet-like workpieces pertaining to a battery material including a positive electrode, a negative electrode, a separator, and a cell composed of the positive electrode, the negative electrode, and the separator, the battery material stacking device comprising:

a conveyance mechanism configured to convey the sheet-like workpieces in a predetermined direction, wherein each of the sheet-like workpieces comprising an upper surface and a lower surface opposite to the upper surface, wherein the conveyance mechanism comprises a first conveyance mechanism arranged on a upstream side in a conveyance direction of the sheet-like workpieces and a second conveyance mechanism arranged on a downstream side in the conveyance direction of the sheet-like workpieces, and wherein the first and second conveyance mechanisms are arranged in a way that the sheet-like workpieces are conveyed from a top surface of the first conveyance mechanism to a bottom surface of the second conveyance mechanism;

a rotor arranged in a vicinity of the second conveyance mechanism, the rotor being configured to rotate about a predetermined rotation shaft in a predetermined rotation direction and to contact with the sheet-like workpieces when the sheet-like workpieces are conveyed on the second conveyance mechanism;

a plurality of holding portions for holding the lower surface of the sheet-like workpieces, arranged in an equal interval in a circumferential direction of the rotor, wherein the plurality of the holding portions are parts of the rotor and rotates with the rotor;

and a stacking table located below the rotor, configured to stack the sheet-like workpieces thereon, wherein the plurality of holding portions is each configured to contact and hold the lower surface of a corresponding sheet-like workpiece in a manner when the rotor is rotated in the predetermined rotation direction and the sheet-like workpieces are conveyed on stacking table with the upper surface of sheet-like workpieces facing toward the stacking table.

2. The battery material stacking device as recited in claim 1, wherein when stacking the sheet-like workpieces on the stacking table by the holding portions, the rotor is kept rotating about the predetermined rotation shaft, and the holding portions stops relative to the stacking table.

3. The battery material stacking device as recited in claim 1, wherein the holding portions stacks the sheet-like workpieces on the stacking table in a state of inclining the sheet-like workpieces with the lower surface of the sheet-like workpieces facing the holding portions in the predetermined rotational direction of the rotor.

4. The battery material stacking device as recited in claim 1, wherein immediately before holding the upper surface of the sheet-like workpieces conveyed by the first conveyance mechanism, the holding portions approach the second conveyance mechanism in a state in which a holding surface of each of the holding portions for holding the sheet-like workpieces is parallel to a conveyance plane of the sheet-like workpieces by the first conveyance mechanism.

5. The battery material stacking device as recited in claim 1, wherein immediately after holding the upper surface of the sheet-like workpieces conveyed by the first conveyance mechanism, the holding portions are configured to separate from the first conveyance mechanism in a state in which a holding surface of the holding portions holding the sheet-like workpieces is parallel to a conveyance plane of the sheet-like workpieces by the second conveyance mechanism.

6. The battery material stacking device as recited in claim 1, wherein the holding portions are configured to hold the sheet-like workpieces by suction in a state in which a predetermined gap is formed between a holding surface for holding the sheet-like workpieces and the upper surface of the sheet-like workpieces.

7. The battery material stacking device as recited in claim 1, wherein the holding portions each has a holding surface for holding the sheet-like workpieces, the holding surface is formed on a curved convex surface along the predetermined rotational direction of the rotor.

8. The battery material stacking device as recited in claim 1, wherein the holding portions are configured to be operated by a cam mechanism provided on the rotor.

9. The battery material stacking device as recited in claim 8, wherein the cam mechanism is provided with one or a plurality of cam members each having a cam groove of a predetermined trajectory and one or a plurality of cam followers connected directly or indirectly to the holding portions and slidably fitted in the cam groove.

10. The battery material stacking device as recited in claim 1, wherein the stacking table is provided with a claw member at a front position in the predetermined rotational direction of the rotor, and wherein the claw member is configured to receive a front side edge of the sheet-like workpieces when the sheet-like workpieces is stacked on the stacking table by the holding portions of the rotor.

11. A battery production apparatus provided with battery material stacking device of claim 1 comprising:

a plurality of units each composed of the rotor, the holding portions, and the stacking table as claimed in claim 1 that is arranged along a conveyance direction of the conveyance mechanism, and wherein after completion of staking a predetermined number of sheet-like workpieces by a predetermined unit composed of the rotor, the holding portions, and the stacking table, stacking of the sheet-like workpieces by another unit composed of the rotor, the holding portions, and the stacking table is initiated.

12. A battery production apparatus provided with the battery material stacking device recited in claim 1.

* * * * *